United States Patent
Iwanowski et al.

(10) Patent No.: US 6,343,261 B1
(45) Date of Patent: Jan. 29, 2002

(54) APPARATUS AND METHOD FOR AUTOMATICALLY DIAGNOSING A TECHNICAL SYSTEM WITH EFFICIENT STORAGE AND PROCESSING OF INFORMATION CONCERNING STEPS TAKEN

(75) Inventors: Sebastian Iwanowski, Glienicke; Ute John, Berlin; Volker May, Berlin; Mugur Tatar, Berlin, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/171,417
(22) PCT Filed: Apr. 18, 1997
(86) PCT No.: PCT/EP97/02008
§ 371 Date: Nov. 16, 1999
§ 102(e) Date: Nov. 16, 1999
(87) PCT Pub. No.: WO97/40445
PCT Pub. Date: Oct. 30, 1997

(30) Foreign Application Priority Data

Apr. 19, 1996 (DE) .......................................... 196 17 109

(51) Int. Cl.[7] .............................................. G06F 19/00
(52) U.S. Cl. ...................................... 702/183; 709/108
(58) Field of Search ........................... 702/33–35, 183, 702/108, 119, 186, 121–123, 182–185, 188, FOR 103, FOR 104, FOR 170, FOR 123–FOR 126, FOR 134–FOR 136, FOR 171; 711/147–148; 709/104, 108; 707/102; 712/220; 714/46, 55, 6; 710/10

(56) References Cited

U.S. PATENT DOCUMENTS

| | | | | |
|---|---|---|---|---|
| 3,916,177 A | * | 10/1975 | Greenwald | 714/46 |
| 3,916,178 A | * | 10/1975 | Greenwald | 714/46 |
| 4,608,688 A | * | 8/1986 | Hansen et al. | 714/6 |
| 5,097,470 A | * | 3/1992 | Gihl | 714/55 |
| 5,379,431 A | * | 1/1995 | Lemon et al. | 710/10 |
| 5,574,915 A | * | 11/1996 | Lemon et al. | 712/220 |
| 5,808,919 A | * | 9/1998 | Preist et al. | 702/183 |
| 6,032,174 A | * | 2/2000 | Avsan et al. | 709/108 |
| 6,108,614 A | * | 8/2000 | Lincoln et al. | 702/183 |

OTHER PUBLICATIONS

Catino, C.A. et al., "Automatic Generation of Qualitative Models of Chemical Process Units," Computers & Chemical Engineering, Aug. 1991, UK, vol. 15, No. 8, ISSN 0098–1354, pp. 583–599.

(List continued on next page.)

Primary Examiner—Marc S. Hoff
Assistant Examiner—Khoi Duong
(74) Attorney, Agent, or Firm—Venable; Norman N. Kunitz (57) ABSTRACT

A device for model-based diagnosis of a technical system, wherein the device determines which parameter is to be measured as the next one, and derives further parameter values from values for specific parameters. For these values, a process often referred to as the "propagation of values" employs a library with models of the component types and a model for the design of the technical system. The purpose of its device is to efficiently store information about measures with which parameters values are determined, and to quickly evaluate the determined values. This information establishes under which prerequisites measures may be implemented, and what their implementation costs. One aspect of the invention establishes that and how this information is stored in libraries of component types so as to be re-used. The primary advantage: the cost of producing the diagnosis device is reduced significantly in comparison to the state of the technology. A further aspect teaches a particular design of a "focusing Reason Maintenance System," a mechanism that administers the connections between different parameter values during a diagnosis. The concept is to divide the focus of the RMS in a specific manner, thereby saving substantial calculation time.

31 Claims, 2 Drawing Sheets

OTHER PUBLICATIONS

Jiah–Shing Chen et al., "Action Selection in Interactive Mode–Based Diagnosis," Mar. 2, 1992, Proceedings of the Conference on Artificial Intelligence Applications, Monterey, Mar. 2–6, 1992, Nr. Conf. 8, pp. 67–73, IEEE.

Beringer, H. et al., "Diagnosing Systems Modeled with Piecewise Linear Constraints," Nov. 6, 1990, Proceedings of the International Conference on Tools for Artificial Intelligence, Herndon, Nov. 6–9, 1990, Nr. Conf. 2, pp. 308–313, IEEE.

Randall Davis and Walter Hamscher, "Model–Based Reasoning: Troubleshooting," Exploring Ar;tificial Intelligence: Survey Talks from the National Conferences on Artificial Intelligence, San Mateo, 1988, pp. 297–346, H. E. Shrobe, ed.

Automatic Diagnostics of Failures of Power Equipment by Means of a Digital Computer, Energetika, Jan. 1980, vol. 30, No. 1, ISSN 0375–8842, pp. 21–24.

* cited by examiner

APPARATUS AND METHOD FOR AUTOMATICALLY DIAGNOSING A TECHNICAL SYSTEM WITH EFFICIENT STORAGE AND PROCESSING OF INFORMATION CONCERNING STEPS TAKEN

BACKGROUND OF THE INVENTION

The invention relates to a device for automatic diagnosis of a technical system.

The state of the technology is described below.

The object of the technical diagnosis is to localize the component errors that occur in a specific technical system (tS). For this purpose, values of parameters must be measured at tS.

The state of the technology encompasses different methods and devices for diagnosing a technical system tS through the evaluation of a model of tS. It is known that it is often costly to construct a model that is adequately realistic. To reduce the expenses when a plurality of similar components is installed in the technical system, or when a plurality of similar technical systems is to be modeled and subsequently diagnosed, approaches have been developed for describing the object to be diagnosed with a component-oriented model. The model reflects the structure of the technical system in components. The generic scope of the invention falls into this category. In contrast, numerous modeling approaches from the regulating technique, such as differential equations, are not component-oriented.

Prior to the diagnosis, a human expert must input once the information about the structure and function of the technical system tS, and the possible errors and the determination of these errors, that the diagnosis device requires for searching the errors. This process, which is often referred to as knowledge acquisition, is time consuming and error-prone. Therefore, a principal challenge is to design the diagnosis device to operate with as little input information as possible and automatically generate as much of the required information as possible from the input information.

The attached drawings illustrate the function of a model-based diagnosis device by way of an example.

The foundation of the present claim to patentability is described in the overview article by Randall Davis and Walter Hamscher: "Model-Based Reasoning; Troubleshooting" in: Walter Hamscher and Luca Console and Randall Davis: "Readings in Model-Based Diagnosis," Morgan Kaufmann Publ. (1992), pp. 1–24. Each component of tS possesses different behavioral modes; in the simplest case, the modes are "intact" and "defective." A diagnosis allocates each component a behavioral mode, thereby specifying which components are defective.

The term "diagnosis" has two meanings: First, it refers to the process of finding the errors in the technical system tS and, second, it describes the result of this search.

An important class of model-based diagnosis methods is presented in the above-cited article by Randall Davis and Walter Hamscher, namely the General Diagnostic Engine (GDE). The aforementioned figures illustrate the function of such a GDE by way of a simple example.

Figure 1:
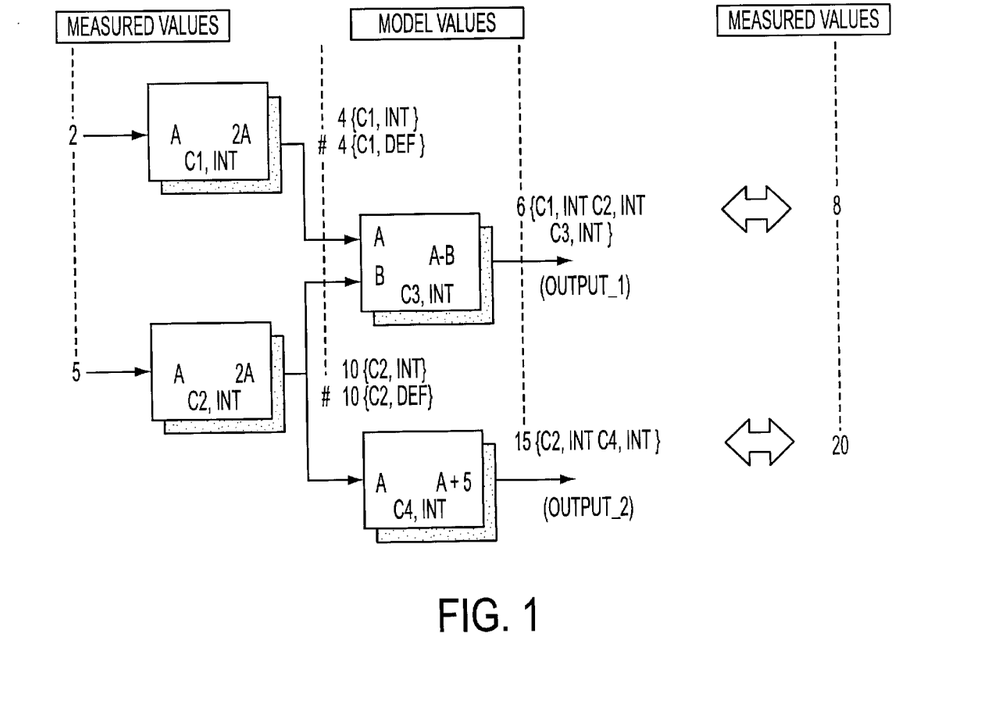
FIG. 1 shows a circuit having two multiplier systems, a subtraction system and an addition system.

In FIG. 1, C1 and C2 double their respective input value. C3 forms the difference between its two input values, and C4 increases its input value by 5. The values 2 and 5 were supplied to this circuit, and 8 and 20 were measured as output values. Under the assumption that all of the components operate error-free, 6 or 15 would have to be the attained result. Consequently, a component is defective.

If a measurement has revealed that the value x is present at the input of the component C2, and if f2 and f4, the behavioral models for the components C2 and C4, respectively, are in the "intact" behavioral mode, the model predicts the value $z=f4(f2(x))$ for the output of C4 if it is assumed that C2 and C4 are intact. This is because $y=f2(x)$ in this example is simultaneously the output of C2 and the input of C4.

Figure 2:
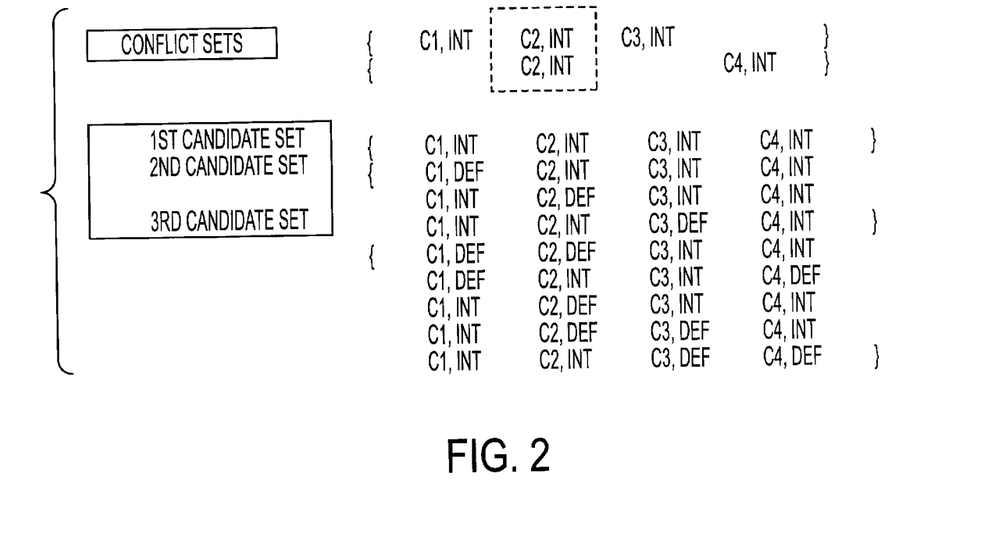
FIG. 2 shows conflict sets and candidate sets of the circuit according to FIG. 1.

For each model value (every value that is predicted by the model), FIG. 2 notes which assumptions must be met so that the model yields this value. For example, the value 15 is obtained under the assumption that both C2 and C4 are intact. Two desired/actual differences were determined; therefore, there are two conflict sets. On the one hand, C1, C2 and C3 cannot be intact simultaneously because of the deviation at Output_1; on the other hand, C2 and C4 cannot simultaneously be intact because of Input_2.

The candidate set prior to the beginning of the diagnosis includes only one candidate, namely the one that allocates all components the behavioral mode "intact." The candidate set is expanded with the aid of the conflict set to subsequently reduce the candidate set to its minimum through assumptions and measures.

In the first step, the conflict set is evaluated as follows:
{(C1, intact), (C2, intact, (C4, intact)},
and in the second step, the conflict set is evaluated as
{(C2, intact), (C4, intact)}.

The candidate set after the first step with the first conflict set includes the candidates [(C1, defective), (C2, intact), (C3, intact), (C4, intact)].

This candidate set is refuted by the second conflict set. The corrected, direct successors are [(C1, defective), (C2, defective), (C3, intact), (C4, intact)] and [(C1, defective), (C2, intact), (C3, intact), (C4, defective)]. The two successors are consistent with the two observations, and are therefore incorporated into the candidate set after Step 2.

The following options are available for continuing the diagnosis in this situation and reducing the candidate set:

The first option determines further measured values. In the event that the desired value 4 is present at the output of C1, GDE supplies {(C1, defective)} as the third conflict set, and excludes all candidates that allocate C1 the defective mode.

A further option involves a "single fault assumption," i.e., it is assumed that, at the most, one component is defective at any one time. The diagnosis of [(C1, intact), (C2, defective), (C3, intact), (C4, intact)] follows immediately afterward.

The physical behavior of each component that appears at least once in tS is described one time in the definition of the input and output parameters and the internal parameters of the component, and in the description of the connections between the parameters as relations (constraints). A special type of component parameter is the behavioral modes of the component. The constraints of a component can be universal, and be allocated to certain behavioral modes of the component, which means that they are only applicable when the component has assumed the respective behavioral mode.

Model-based diagnosis presupposed that the behavioral of the components can be described locally, that is, the allocation of values to each component's parameters is solely dependent on the allocation of values to other parameters of the same component. Then, it is only necessary to describe each type of component once; the diagnosis device can re-use this description, which significantly reduces the amount of required input information.

The technique of model-based diagnosis is especially advantageous in comparison to other methods if the components to be described are of a simple nature (e.g., electrical or hydraulic components) and appear numerous times in tS. The diagnosis device thus evaluates a library with the description of all component types, as well as a construction model of the technical system. This construction model describes how the components are connected to one another. A component Comp_1 is connected to a component Comp_2 through the identification of the parameter Para_1 at Comp_1 with a parameter Para_2 at Comp_2. The construction model further describes the type of each component. The diagnosis device automatically constructs the model of the technical system tS from the descriptions of the component types and the construction model.

Most of the known diagnosis methods, and the diagnosis device of the invention, presuppose that the technical description of the system tS to be diagnosed does not change during a diagnosis, in other words, the library with models of component types and the construction model are valid for the entire diagnosis. The set of diagnoses that are possible in theory is therefore set at the start of the diagnosis: Each allocation of behavioral modes to all components of the technical system is a possible diagnosis. The diagnosis device iteratively limits the extremely-large set of possible diagnoses during the diagnosis process. The most important type of limitation is that parameters are allocated measured or observed values. During the diagnosis, each model-based method repeatedly determines which diagnoses are still possible in view of the parameter values that have been determined to this point. For this purpose, the method allocates behavioral modes piecewise to a few components, and determines which values certain parameters of the technical system would have to assume in this allocation, which is often called a hypothesis. If this prediction does not match the measurements, the hypothesis is refuted and retracted. A diagnosis device must store information about the measures that can be implemented over the course of the diagnosis. Measures are necessary for determining parameter values or bringing the technical system into a certain state. A measure can be linked to prerequisites, that is, the measure may only be performed if the prerequisite is satisfied. The prerequisite can stipulate that certain parameters have assumed certain values. The measures that can be performed during a diagnosis are associated with different costs; this must be taken into account in the selection of the respectively next measure. These requirements are explained by way of two examples from practice (diagnosis of motor-vehicle electronics):

Some measures can or may only be implemented in certain situations during a diagnosis, and not in others. An example: The ignition time can only be determined when the engine is running. The measurement "ignition time" is therefore associated with the prerequisite "engine is running."

The two following measures incur widely-varying implementation costs:
  the inquiry of an error code that is stored in a control device; and
  the measurement that indicates the internal resistance of a certain electrical line, the measurement requiring the removal of particular components.

In many studies, measures with which parameter values are observed differ from measures through which parameters obtain specific values. The first type includes the query: "Is the engine running?", while the second one includes the measure "Turn on engine."

Diagnosis devices of the state of the technology operate with methods of automatically determining the respectively next measure. Two approaches are described in Johan de Kleer and Brian Williams: "Diagnosing Multiple Faults," in: Walter Hamscher and Luca Console and Randall Davis: "Readings in Model-Based Diagnosis," Morgan Kaufmann Publ. (1992). The approaches utilize probability-theory methods to evaluate the anticipated effectiveness of any possible measure as entropy. Their method is known in the literature as the "systematic observation proposal." Because the precise calculation of the de posteriori probabilities and thus of the entropies after the input of an additional known value is very calculation-intensive, the authors propose to replace the de posteriori probabilities of diagnoses that continue to be possible with the a priori probabilities, and replace the de posteriori probabilities that are valid prior to the measurement, but no longer after the measurement, with zero. The authors propose further simplifications as well.

The number of measurements taken over the course of a diagnosis, and the speed of a diagnosis, are extensively dependent on probabilities. There is no systematic, engineer-style procedure for structuring such probabilities for arbitrary partial systems. Probabilities can be estimated for a technical system if numerous errors have already occurred in the system and measurements were taken, so data material is present for statistical analyses.

In Peter Struss: "Testing for Discrimination of Diagnosis," Proceed. $5^{th}$ Intern. Workshop on Principles of Diagnosis, New Paltz (N.Y., USA), pp. 312–320 (1994), Struss indicates that parameters can assume different values under different prerequisites, that is, with different values of other parameters. In this essay, a generalization of the systematic observation proposal is formulated; here, it is called "systematic test proposal." The fundamental principle of his proposed solution lies in calculating the best prerequisites for a parameter p to be able to distinguish among a given set of diagnoses that are still possible. If these prerequisites are values for parameters that must be measured in turn, and cannot be set, their prerequisites are also calculated, etc.

A systematic method of modeling the sequence of measures is described in Ying Sun and Daniel Weld: "A Framework for Model-Based Repair," Proceed. $11^{th}$ National Conference on Artificial Intelligence, Monterey (USA), pp. 182–187 (1993). Constructs were defined for measures, provided with cost information and incorporated into the diagnosis algorithm. A measure is described by a parameter of the technical system tS to which it relates, a logical predicate that represents the prerequisites of the measure, and its purposes. The prerequisites can be arbitrary value contexts of the technical system. A value context is the allocation of values to parameters of the technical system. The cost of a measure can be a function of its prerequisites. This essay describes a method of estimating the cost of a repair plan from the cost for the involved measures, and a formula is given for estimating the cost of a measure in advance.

There is no indication, however, of how the costs for the individual measures are obtained and stored efficiently in reality. The only way of storing the information about measures is the obvious process of a human expert making all information about the possible measures directly available to the diagnosis device. Consequently, the expert must enter the information "by hand"; hence, the diagnosis device requires a large amount of input information.

C. A. Catino et al. describe in "Automatic generation of quality models of chemical process units," Computers and chemicals engineering, Vol. 15, No. 8, pp. 583–599 (1991) how a model of a technical system is automatically generated from re-usable models of components that are stored in a library. The application described in C. A. Catino et al. is a chemical process, and the components are partial processes. These component models include "quality conditions";

"relations" (quantitative constraints on how model parameters can be determined from other model parameters); and "influences" (qualitative descriptions of how parameters influence other parameters).

"Operating assumptions" are also mentioned.

The article mentions that the model can also be used for diagnosis: Compare measured values with desired values that are predicted in the evaluation of the model, and draw conclusions about errors in the technical system from differences between these values.

As is apparent, measures must be implemented for determining the measured values. C. A. Catino et al. do not, however, illustrate how the described device automatically finds these measures and tests which measures are permissible under certain operating conditions and/or measured values.

The essay by Catino et al. does not describe how to organize and store the information that establishes how to measure parameters and under which conditions these measurements can be taken. The article neglects to mention that the measures and prerequisites are elements of component models, as well as how these prerequisites are tested regarding the operational time. Hence, no procedure is given for performing the task successfully with the least input information.

In Jiah-Shing Chen et al.: "Action Selection in Interactive Model-Based Diagnosis," Proc. Eighth Conf. Artificial Intelligence Applications, Monterey (USA), pp. 67–73 (1993), the authors treat the task of automatically selecting measures—more precisely, "tests" for measuring variables and "replacement actions" for a piecewise component exchange. Every possible failure is assigned a probability, and a constraint that is derived from a probability-theory model selects the measure that, among all possible measures, is the most beneficial, as a function of the values measured to this point. This measure is the one that can be expected to have the lowest cost for the further diagnosis.

The essay by Jiah-Shing Chen et al. also does not specify how these "tests" and "actions" should be stored. It merely mentions the obvious alternative of defining and storing all possible measures in advance. This can be extremely costly: As an example, the technical system is a circuit having 100 resistors and 50 lighting fittings. Two "tests" and one "replacement action" can be executed for each circuit and each lighting fitting. Therefore, 300 "tests" and 150 "replacement actions" must be defined and stored. The essay by Jiah-Shing Chen et al. does not disclose an efficient means of determining the measure (i.e., the "test" or "replacement action") that is to be implemented next. The paper derives a calculation constraint $\Delta(M)$ for each measure M as a measure of the cost to be expected for the further diagnosis if the measure M is implemented as the next measure. The only disclosed procedure of the diagnosis device for determining the next measure is the determination of the value $\Delta(M)$ for each measure M that is still possible, then the implementation of the measure M0 for which $\Delta$ is minimal. This procedure does not work in practice: In the above example, $\Delta$ must be applied to 450 measures. These 450 calculations must be repeated (after the first measure, only 449 calculation procedures remain, then 448 after the second measure, and so on) until the error has been found and remedied. Should only 20 measures be necessary for a complete diagnosis (for 450 components, this is an outstanding value), $\Delta$ must be applied to a measure 450+449+ . . . +431=8.790 times during a diagnosis; even a single calculation process can be complicated. The procedure disclosed in the paper is applicable for imaginary examples, but not for technical systems in the real world.

Without explicitly stating this, the paper apparently presupposes that any measure can be implemented at any time; and the implementation of each measure is equally costly—the only difference is the number of further measures that are still necessary after a measure, and the fact that the anticipated further cost is determined from these different values.

These assumptions are not applicable in practice, for example in the diagnosis of motor-vehicle electronics. An efficient diagnosis device must therefore be constructed with this fact in mind.

In "Automaticka diagnostika poruch energetickych zarizeni cislicovym pocitacem," Energetika Vol. 30, No. 1, pp. 21–24 (1980), Vitezlav Benes presents a method of determining the measure to be implemented next.

This method evaluates occurrence probabilities for errors and the probabilities that specific errors will be found in certain tests on the object to be diagnosed. The probability theory (Bayes rules) and information theory (Shannon entropy) are used to determine which effectiveness has a test that has not yet been performed. The cost for the test is compared to this effectiveness, and the test having the most favorable cost-effectiveness ratio is selected. This paper also fails to indicate a procedure for efficiently determining the cost information from the least possible input information, and how fast the next measure is determined during the diagnosis procedure. The only apparent procedure is how the human expert makes all measures (=tests) that can be performed on the technical system directly available to the diagnosis device, and the cost-effectiveness ratio is to be calculated prior to each diagnosis step for all measures that are still possible. This procedure is feasible for the cited example, which has 20 errors and 20 possible measurements. It is inadequate for more complex examples comprising thousands of possible errors and tests. This essay also does not indicate how the diagnosis device operates with the least possible input information.

Numerous other approaches also employ an entropy function to determine the effectiveness that the knowledge about a parameter value would have. A cited example is the essay by Johan de Kleer and Brian Williams: "Diagnosing Multiple Faults," in: Walter Hamscher and Luca Console and Randall Davis: "Readings in Model-Based Diagnosis," Morgan Kaufmann Publ. (1992).

The work by Vitezlav Benes also does not indicate how to structure diagnosis devices for a plurality of technical systems other than to start "from zero" again each time. A single application example, namely the oil-filter system in a 100-kV transformer, is presented. All of the probabilities must be re-entered for a different application example.

Figure 3:
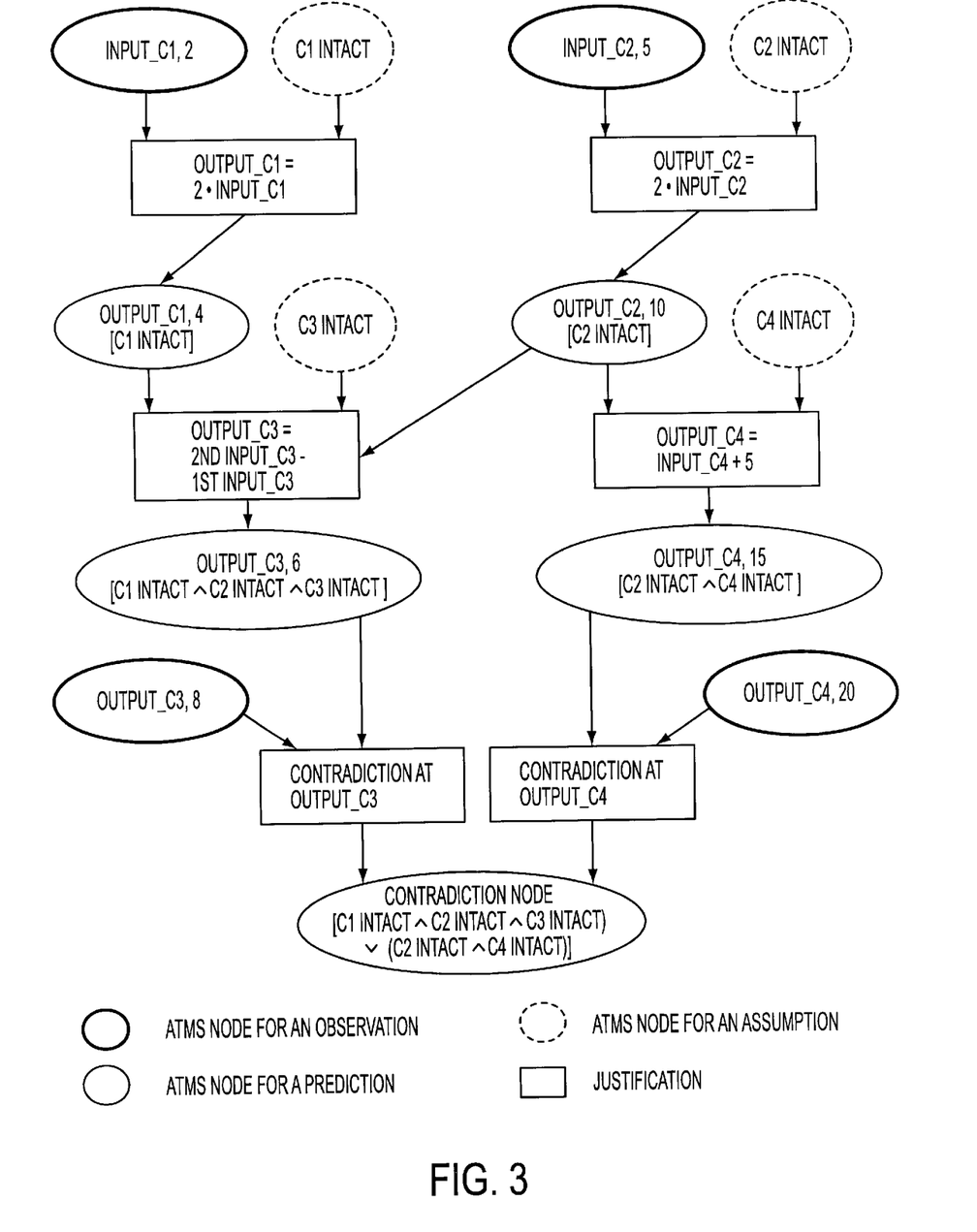
FIG. 3 shows a special reason maintenance System, (RMS) for the circuit according to FIG. 1.

Practically all diagnosis methods known from the state of the technology, and a diagnosis device within the generic scope of the present inventions, operate with an inference machine. An inference machine repeatedly reaches ("infers" or "propagates") conclusions about values of further parameters from parameter values that have already been calculated or measured, based on the model of tS. Mechanisms have been developed for re-using existing calculation results instead of performing re-calculations. Of course, calculation results can only be re-used if the context that was presupposed in the calculations is still valid. These mechanisms store and "administer" parameter values of value contexts, namely the allocations of values to parameters. A mechanism of this type is referred to as the "Reason Maintenance System" (RMS) or the "Truth Maintenance System" (TMS). Before the inference machine derives parameter values, it "consults" the RMS regarding known parameter values. In the cited article by Randall Davis and Walter Hamscher: "Model-Based Reasoning; Troubleshooting" in: Walter Hamscher and Luca Console and Randall Davis: "Readings in Model-Based Diagnosis," Morgan Kaufmann Publ. (1992), the use of a special RMS, the "Assumption-Based Truth Maintenance System," is described for model-based diagnosis as "enabling technology" for the "General Diagnostic Engine" (GDE), which is a class of diagnosis devices. In "Building Problem Solvers," MIT Press (1993), Ken Forbus and Johan de Kleer describe different types of RMSes. FIG. 3 shows an RMS that is configured as an ATMS, in the form of the circuit according to FIG. 1.

An ATMS is formally a directional graph having two types of nodes:

An ATMS node stands for an assumption or a statement about the technical system. FIG. 3 shows a corresponding ATMS graph.

A "justification" asserts why a statement was derived. In connection with model-based diagnosis, a justification stands for a relation among the parameters of a component, which were derived from a behavioral model with constraints.

An ATMS node performs one of the following three tasks:
1. Allocation of a behavioral model of a component to a node for an assumption;
2. allocation of a pair (parameter, value) to a node for an observation; or
3. allocation of a triplet (parameter, value, marking) to a node for a derived statement (prediction). A marking (label) is a single environment or an OR link of environments. An environment lists the assumptions under which the parameter value is valid. In the context of model-based diagnosis, an environment is a list of the behavioral modes of components that must be present so that the parameter can be predicted based on the observations with the overall model. A specially characterized ATMS node for a derived statement is the conflict-set node (contradiction node), at which the problem solver can read off the conflict sets. Its marking is determined exactly like the marking of every other ATMS node for derived statements. Each environment is a conflict set in its marking.

The justifications, assumptions, observations and statements originate from the problem solver. The object of the ATMS is to efficiently derive the assumptions, among which one statement is applicable, and to update them after these new observations.

As requested by the problem solver (inference machine), the ATMS designates a node for each observed value and each calculated value of a parameter, and for each behavioral mode. The problem solver controls the ATMS through the following "messages":
1. It "transmits" the measured parameter values and behavioral modes to the ATMS; and
2. It calculates parameter values from known values. The ATMS notes these derivations as justifications. The problem solver applies the marginal conditions and the behavioral models, not the ATMS itself. The problem solver, not the ATMS, evaluates the fact that, if the component C1 is intact, its initial value is two times the input value.

In FIG. 3, the problem solver has discovered two discrepancies, and the ATMS has noted them as two justifications, and determined the current conflict sets as environments of the contradiction node.

If no contradictions were observed, the output value of C3 would actually be 6, while the initial value of C4 would be 15, so no new ATMS node would be generated; rather, the nodes for the statements Output_C3=6 and Output_C4=15 would be updated. This can be attributed to the fact that values have been observed that cause the nodes to become nodes for observations, that is, the markings are canceled. Also, all of its successors are updated.

The ATMS automatically administers the marking, that is, the set of environments, of each node. The original ATMS notes the current marking such that
1. the statement about the node is applicable for each environment (soundness);
2. no environment is explicitly refuted (consistency);
3. each environment in which the statement about the node is applicable is noted at the node, or is a superset of a noted environment (completeness); and
4. no noted environment is a partial set of another environment (minimality).

The original GDE, used in conjunction with an original ATMS, determines all conflict sets after each observation, and then all diagnosis candidates. The original ATMS therefore re-calculates all markings after each observation, so each marking of a node satisfies the four aforementioned criteria of soundness, consistency, completeness and minimality following each calculation step. This method requires a calculation time that increases exponentially in the number of statements, and is therefore very calculation-intensive.

In "Diagnosing systems modeled with piecewise linear constraints," Proceed. TAI90—Tools for Artificial Intelligence, Herndon, Nov. 6–9 (1990), Henri Beringer and Bruno de Backer describe a method of converting the model in advance such that the work of the inference machine takes little time. Because this conversion is performed in advance, it is not dependent on parameter values obtained during the diagnosis. Therefore, no proposal is given for quickly deriving further values from measured values and hypotheses about behavioral modes.

The state of the technology includes a class of methods and devices for limiting the operational-time requirement of the RMS, namely the focusing RMS. A "focus" is a memory that functions as an interface between the inference machine and the RMS. The inference machine writes value contexts, that is, value allocations of parameters, into the focus. This is often the current most plausible diagnosis of the diagnoses that are still possible, that is, certain behavioral modes of components; diagnoses that were plausible before can be refuted through further measurements. The RMS only completely administers the dependencies for the value contexts in the focus. Whenever the inference machine changes the focus, the RMS again determines dependencies. Different types of focusing RMSes are presented in the book by Ken Forbus and Johan de Kleer, specifically the JTMS (pp. 171–194) and the LTMS (pp. 265–305). An especially efficient embodiment of a focusing RMS is the two-view ATMS known from Mugur Tatar: "Combining the Lazy label Evaluation with Focusing Techniques in an ATMS," Proceed. 11th European Conference on Artificial Intelligence, Amsterdam (1994).

The article by C. A. Catino et al. also mentions conditions and focuses. Unlike in the invention, however, they do not decide on the validity of measures. Instead, these conditions limit the model such that the model can only be observed for specific operating conditions (namely the ones to be investigated). Three focusing techniques are named for this purpose. There is no mention of who selects the information that is stored in the focus. Obviously, a human user selects the information once and, during the model generation, the focus remains unchanged. Therefore, the focus cannot be dependent on measured results obtained over the course of the diagnosis. The focus cannot, in particular, include the diagnoses that are the most probable or most plausible based on the previous measurements.

Inference results can be dependent on two types of influence variables:

Which values are allocated to freely-selectable input parameters of the technical system; and in which behavioral modes the components of the technical system are located.

The state of the technology encompasses numerous methods in which the inference machine derives further parameter values, and possible diagnoses, from the measured values for a single value allocation of input parameters. Clearly, however, operational time is saved when the inference results that are valid in the old and the new value allocations are re-used for a different value allocation to input parameters. This procedure is first treated in Oskar Dressler and Hartmut Freitag, "Prediction Sharing Across Time and Contexts," Proceed. 12$^{th}$ National Conference on Artificial Intelligence, Seattle (USA), pp. 1136–1141 (1994), and formulated such that inference results are re-used for different times. This paper presents how assumptions are modeled for temporal aspects. There is, however, no proposal for configuring the interface between the RMS and the inference machine, and how this interface is controlled. There is also no indication of how calculations are made for only one time, on the one hand, yet interference results can be re-used for different times.

The object of the invention is described below.

SUMMARY OF THE INVENTION

The object of the present invention is to provide a model-based device and a corresponding method, which is based on this device, for diagnosing a technical system comprising components, the device utilizing as little input information as possible to automatically generate all of the required information about measures that are implemented over the course of the diagnosis, and the device diagnosing the technical system quickly and at the lowest cost, with these measures being implemented and evaluated.

Specifically, this means that:

In a "model-based device," the diagnosis device uses a component-oriented model of the object to be diagnosed, which is automatically generated from a library of component models and a construction model of the object to be diagnosed (generic scope of the invention).

Measure-related information includes the prerequisites under which the measure may be implemented, and the cost of implementing the measure.

The requirement of the least possible input information means that the information about measures is to be stored in the device such that duplicate information need only be stored once, and can be re-used automatically. This applies for measures that determine parameter values, as well as for those that set parameters at specific values.

The requirement for a fast diagnosis particularly means that the diagnosis device should only perform inferences for a given allocation of values to input parameters and an allocation of behavioral modes at components, yet re-use the results of these inferences for other value allocations or other allocations of behavioral modes. The diagnosis device should include an RMS for noting on which value allocations and/or allocations the inference results depend.

The concept of the invention is to formalize and store the required information about measures in a particular manner, namely to define them locally for the component types. Therefore, not only are parameters and constraints stored in the library, but information about the measures relating to the parameters of the component type are also stored there. The establishment of the parameters to which a measure relates, and an identification of the cost, are stored locally.

The diagnosis device evaluates the component-oriented system model to determine the validity of a measure in a predetermined value context. It does this through the propagation of parameter values through the model by the inference machine until the diagnosis device can decide whether the measure is valid in the value context.

So that the diagnosis device operates as quickly as possible and only makes the respectively necessary calculations, the focus was embodied as an interface between the inference machine and the RMS in an inventive manner.

The invention is described below.

DESCRIPTION OF THE PREFERRED EMBODIMENTS

A diagnosis device within the generic scope of the invention includes two information-processing devices as its components:

A diagnosis machine that controls the operation of the other components of the diagnosis device and performs error searches; and an inference machine that derives further parameters from the known parameter values.

The library with models of component types is stored in a memory region S1, while the construction model is stored in a memory region S2. Over the course of the diagnosis, parameter values are determined—usually repeatedly—and assumptions are made about behavioral modes of components. These measurement results and assumptions are all formally treated as parameter values. Such an allocation of values to different parameters is referred to hereinafter as a value context. Value contexts are stored in a memory region S3 (permanent or volatile). S3 can store different value contexts from which the diagnosis machine selects one, for example, the most plausible. The parameter values that the inference machine derives from the value contexts in S3 are stored in the memory region S4. The inference machine evaluates the library in S1 and the construction model in S2 for these derivations.

All of the memory regions described here can be permanent or volatile.

To accomplish the object of the invention, the required information about measures is not stored globally in its own memory region, as in the state of the technology, but locally for a component type. Each measure (M) relates to a certain component of the technical system (tS). The information about M is therefore stored along with all of the other information about the component type of (Comp). For a component type, therefore, not only are the parameters of ports, constraints and behavioral modes stored in S1, but also information about measures at the component.

This information can therefore be re-used for each component of this component type. This re-use is especially advantageous when a plurality of components of the same type is installed in the technical system (tS), or when different technical systems, in which identical components are installed are to be diagnosed. Storage in the library for component types therefore fulfills the requirement of the least possible input information.

The invention according to claim 1 teaches how which measure-related information is stored in the library:

On the one hand, each measure at a component type relates to a parameter of this component type. This means that the measure determines the value of the parameter, or sets a certain value of the parameter. The information about the parameter to which a measure M relates is stored in a partial memory region S1.1 of S1.

On the other hand, it is determined how the prerequisite for the validity of a measure is stored. A measure is valid in a specific value context WT (a specific set of parameter values) if it may be implemented in the value context. The prerequisite for the validity of M is stored as a local prerequisite in a second partial memory region S1.2 of S1. This means that S is a measure that is implemented at the component type Comp Type and relates to a parameter of Comp Type. The local prerequisite of M is a constraint that lists other parameters of Comp Type, and determines which value these other parameters may have so that M can or may be implemented.

In accordance with the invention, the information about most measures that can be implemented over the course of a diagnosis at the technical system can be stored as information about local measures.

Below, the contrasting case that M is a measure for which this is not possible is observed. The human expert who formulates the input information formally inserts a component type Comp Type tS for the technical system tS as a whole. S1 stores information about Comp Type tS, exactly like the information about other component types. S1.1 stores the indication of the parameters at tS to which M relates, and S1.2 stores the local prerequisite. Thus, M is a local measure in the sense of the invention. With this technique, the required information about each measure can be stored and evaluated according to the invention.

The inference machine derives parameters from the value contexts in S3. Based on the parameter values in S3 and S4, the diagnosis device decides whether a measure M can be implemented by comparing the local prerequisite of the measure M to the current parameters.

Claim 2 describes an advantageous embodiment of the diagnosis device; here, it is determined how the diagnosis device evaluates the input information.

A further information-processing device, referred to as a model generator, generates a model of the technical system to be diagnosed from the libraries with component models (stored in S1) and the construction model (stored in S2). The model generated in this manner is stored in S6. In accordance with the state of the technology, the information indicating that a component Comp__1 is connected to another component Comp__2, and how, is stored in the form that notes which parameter Para__1 at Comp__1 is connected to a parameter Para__2 at Comp__2. The advantageous embodiment teaches two ways of utilizing this information: Either both Para-1 and Para__3 are replaced in S6 by a third parameter Para, which is a unique copy of Para__1 and Para__2. In the information about measures, the references to Para__1 and Para__2 are universally replaced by references to Para. Each measure M that previously related to Para__1 (that is, determines the value of Para__1 or sets a value) now relates to Para. The same applies for each measure that previously related to Para__2. In the event that Para__1 previously occurred in the local prerequisite of a measure, Para now occurs; the same applies for Para__2; or a constraint, that is, a specification, according to which the value of Para__1 is always equal to that of Para__2, is entered into the memory region S6.

Claim 3 describes an advantageous embodiment of a diagnosis device of the invention with a Reason Maintenance System (RMS). An RMS is known from the state of the technology. The RMS stores the information about which parameter values are derived from which predetermined parameter values that are stored as value contexts in S3. The inference machine derives further parameter values, and the RMS administers the dependencies between the parameter values in S3 and the derived values in S4. The RMS stores these connections in a further memory region S5. The advantageous embodiment according to claim 3 teaches how an RMS is employed to accomplish the task of efficiently testing the validity of measures for different value contexts. This task must be performed during a diagnosis if:

Different value contexts are consecutively stored in S3, and the results of the first value context that are still valid in the second value context are reused for the second value context; or if different value contexts are to be compared.

Over the course of a diagnosis, the diagnosis device must test whether a certain parameter can be measured in a predetermined value context WT. The value context WT comprises measured or set parameter values and/or assumptions about component behavioral modes. In a typical case, this test is performed for a number of parameters, sometimes numerous times for one parameter for different value contexts. Claims 4 and 5 teach how to embody the invention so as to make the input information required for this test available to the diagnosis device. The idea behind this is to use local measures with local prerequisites as input information. The information about the conditions under which the value of a parameter Para can be determined, with Para being a parameter of the component Comp, is stored as follows: The input information in the memory region S1 is expanded by a measure M at the component type Comp Type—Comp Type is the type of the component Comp. The information that M relates to Para is stored. The diagnosis device of the invention tests whether M is valid in the predetermined value context WT. If M is valid, the parameter Para can be measured; otherwise, it cannot.

The following two cases are distinguished: Claim 4 describes the simpler case, namely that the value of Para can or may only be determined in a single value allocation. In this case, a local prerequisite in the form of a value context is noted for the measure M. Accordingly, M is valid if n parameters (Para__1, . . . , Para__n) of the component type Comp Type assume n specific values (Value__1, . . . , Value__n). Claim 5 describes the case that the value of Para may be determined in two different value allocations. The embodiment according to claim 5 can easily be applied to the case of more than two value allocations. With two value allocations, the memory region S1 is expanded by information about two further measures (M1) and (M2), namely one measure per presupposed value allocation. For M1, as for M2, a respective local prerequisite is noted in S1, namely a requested allocation of values to parameters at Comp Type. M1 can be implemented if n parameters ($Para\_1^{(1)}, \ldots, Para\_n^{(1)}$) assume n specific values ($W\_1^{(1)}, \ldots, W\_n^{(1)}$) at Comp Type; M2 can be implemented if m parameters ($Para\_1^{(2)}, \ldots, Para\_m^{(2)}$) assume m specific values ($W\_1^{(2)}, \ldots, W\_m^{(2)}$) at Comp Type. A local prerequisite for M is also stored in S1, namely that M may be implemented if M1 or M2 or both may be implemented.

According to an advantageous embodiment, the diagnosis device of the invention is capable of automatically assessing the cost incurred when the value of the parameter Para is determined at a component Comp. Claim 6 teaches how which input information should be stored. S1 stores information about a measure M at the component type Comp Type of Comp. M relates to Para. M is an "evaluated measure" in the sense that an identification of the cost, which initiates the implementation of M, is stored in a partial memory region S1.3 of S1. In the simplest case, a single identification for the cost is stored in S1.3. If the cost of M depends on which values other parameters have at Comp Type, S1.3 instead stores a calculation specification, which, as a function of the parameter values, produces different identifications for the cost incurred by the measure M. To assess the cost incurred by the determination of Para in the value context WT, the diagnosis device first tests whether the measure M is valid in the value context WT. If M is valid in WT, the diagnosis device uses the identifications that are stored in S1.3 for the cost of M, that is, either a fixed identification or the identification that is obtained through the evaluation of the calculation constraint, as the identification of the cost of Para. These two ways of structuring input information are inadequate when different identifications exist for the cost incurred by the determination of Para, and when different parameters, and not only different values of the same parameters, occur in the prerequisites of the identifications. Claim 7 teaches what to do in this case. For the sake of simplicity, it is assumed that only two different identifications C1 and C2 exist with the prerequisites V1 and V2. Then, information about two measures M1 and M2 is stored in S1. M1 and M2 relate to Para. M1 has the local prerequisite V1, while M2 has the local prerequisite V2. M1 and M2 are evaluated measures in the sense of claim 6.

For an efficient diagnosis, the diagnosis device must not only be able to automatically assess the cost incurred by the determination of the value of a parameter Para, but also the effectiveness resulting from the determination. This effectiveness characterizes the contribution made by the knowledge of the value of Para for the determination of the component errors at the technical system. The state of the technology includes different approaches for the determination of this effectiveness by the diagnosis device. These methods can yield different values for the effectiveness of a parameter in the same situation. An advantageous embodiment of the present invention, namely claim 8, describes how a diagnosis device of the invention takes into consideration both the effectiveness of a parameter and the cost of determining it. On the one hand, the diagnosis device determines an identification of the cost according to claim 6 or 7. On the other hand, it determines the effectiveness according to a method known from the state of the technology. The diagnosis device includes an operation unit (cost-effectiveness comparator), which receives as input variables the cost and effectiveness, and provides an output value. This output value identifies the ratio of the effectiveness and cost of the parameter Para. Over the course of the diagnosis, the diagnosis device determines the respective value of the parameter having the most favorable cost-effectiveness ratio.

Claim 9 describes a further advantageous embodiment of the diagnosis device, which is capable of automatically determining the parameter Para whose value can be found at the lowest cost when the value of Para is determined to be next in the course of the diagnosis. In the selection of the parameter, it must be taken into account that the technical system (tS) must often first be brought into a certain situation so that the value of Para can be determined. If n different parameters {Para\_1, . . . , Para\_n} are available for selection, it is possible, as a function of the parameter, to distinguish the situations into which the technical system must be brought before the value of the parameter can be determined. An example: The value of "ignition time" (=Para\_1) can be determined in a different situation as the "status of the spark plugs" (Para\_2).

In accordance with the advantageous embodiment, all of the observed situations are predetermined (for example, because the diagnosis machine has determined them in advance) and stored in the memory region S3. A situation is stored in the form of a value context, namely as an allocation of values to all freely-settable parameters of tS (this identification constitutes input information). An allocation of all freely-settable parameters is characterized hereinafter as a situation. The n parameters {Para\_1, . . . , Para\_n}, from which the one incurring the lowest cost is to be selected, are further predetermined. According to claim 6 or 7, for each possible parameter and each situation stored in S3, the diagnosis device first determines which cost is incurred by the determination of the parameter if the technical system tS was brought into this situation. For i=1, . . . , m and j=1, . . . , n, therefore, a cost identification effected by the determination of the parameter Para\_j when the technical system tS was previously brought into the situation S\_i is determined. Afterward, for each of the m situations, the diagnosis device determines the parameter whose value can be determined the least expensively in this situation. For i=1, . . . , m, a parameter Para(S\_i) is selected from the set {Para\_1, . . . , Para\_n} of considered parameters. As the last step, the diagnosis device selects the situation S\_x from the set {S\_1, . . . , S\_m} stored in S3 for which the determination of the values of Para(S\_x) incurs the lowest cost. The diagnosis device has therefore determined which two steps are to be performed next in the course of the diagnosis: First, the technical system is to be brought into the situation S\_x, then the value of the parameter Para(S\_x) is to be determined.

Claims 10 and 11 describe a device that automatically tests whether a parameter Para can be set at a specific value in a predetermined value context stored in S3. The claims are similar to claims 4 and 5. In claims 4 and 5, the value of Para was to be determined; in claims 10 and 11,Para is to have a certain value. Claims 10 and 11 teach the incorporation of a measure M relating to Para into the input information.

A device according to claims 12 and 13 stores the input information from which the diagnosis machine derives an identification of the cost incurred when a parameter is set at a specific value.

The object includes the goal of faster operation of the diagnosis device. More precisely, the diagnosis device should only perform inferences for a respectively given allocation of values to input parameters and an allocation of behavioral modes to components, yet re-use the results of these inferences for other value allocations or other allocations of behavioral modes. The invention according to claim 14 provides a device for this purpose. The device according to the preamble to claim 14 includes a diagnosis machine, an inference machine and a Reason Maintenance System (RMS). The function of these three information-processing units and the significance of the memory region are the same as in the foregoing claims, and were already described above.

The following consideration forms the basis of the invention: The validity of the constraints—i.e., the specifications that describe the dependencies between parameters—is determined by the behavioral modes in which the components are located. All other values of the parameters of the technical system tS result from the given situation and the given allocation of behavioral modes. As long as there is no change in the situation or the behavioral modes of the components, the other values also cannot change. Therefore, the respective behavioral modes and situations are noted for the values that the inference machine has derived. The invention teaches how the interface between the inference machine and the RMS is configured. The idea is to make a sharp distinction between facts that are considered certain and are never retracted by the diagnosis machine over the course of the diagnosis, and hypotheses that can be refuted and thus retracted by the diagnosis machine. Examples of facts are allocations of values, such as "Turn on engine," and observations whose validity is not called into question, to freely-settable parameters. Examples of hypotheses are piecewise allocations of behavioral modes to components, because additional observations can refute these hypotheses, and observations that are categorized as uncertain. The diagnosis device stores facts and hypotheses as value contexts, that is, as information about the allocation of certain values to parameters of the technical system.

One device according to the invention uses a focusing RMS (memory region S3), which was presented in the description of the state of the technology. The idea behind the invention is to use not only one focus, but two external foci and one internal focus.

The facts are stored in the permanent focus (partial memory region S3.1).

The hypotheses are stored in the retractable focus (partial memory region S3.2).

The RMS combines its internal focus (memory region S7) from these two external foci by connecting each value context in the permanent focus to each value context in the retractable focus through a logical conjunction (AND link).

This logical conjunction, which is automatically performed by the RMS is explained by way of an example: These two value contexts are stored in the permanent focus:

{(Para__1=Value__1 and Para__2=Value__2), (Para__3= Value__3)};

these two value contexts are stored in the retractable focus:

{(Para__4=Value__4), (Para__5=Value__5 and Para__6= Value__6)};

the RMS then registers the following value contexts in S7:

{(Para__1=Value__1 and Para__2=Value__2 and Para__4= Value__4), {(Para__1=Value__1 and Para__2=Value__2 and Para__5=Value__5); and Para__6=Value__6), (Para__3=Value__3 and Para__4=Value__4), (Para__3=Value__3 and Para__5=Value__5 and Para__6= Value__6)}.

Each change in the external focus induces the RMS to update its internal focus. The RMS therefore operates in the manner known from the state of the technology, but based on the value context in S7. In S5, it notes the connections between the value contexts in S7 and those in S4.

The advantage offered by this architecture becomes apparent when the RMS finds a conflict. As is known from the state of the technology, the RMS informs the inference machine of a conflict, that is, a refuted value context. An example: For (Para__1=Value__1 and Para__2=Value__2) to be a conflict means that the value of Para__1 cannot be equal to Value__1, or the value of Para__2 cannot be equal to Value__2. The inference machine in a diagnosis device of the invention separates the facts involved in the conflict from the hypotheses. Because the facts qualify as certain, and cannot be retracted, the conflict is reduced to the hypotheses. The inference machine strikes all value contexts containing a hypothesis that occurs in the conflict from the retractable focus. Depending on the selected diagnosis method, the retractable focus is automatically filled with further hypotheses, or not; the state of the technology includes different methods for this "filling" process under the heading of "candidate generation." Corresponding to FIG. 2, the RMS subsequently updates its internal focus as described above.

An advantageous embodiment of the invention according to claim 14 diagnoses an especially simple technical system, namely a static system. The system is static if the behavioral modes of all of its components do not change over the course of the diagnosis. In particular, a component does not fail during the diagnosis (but rather, previously), and no components are replaced during the diagnosis.

In accordance with claim 15, all situations that are set over the course of the diagnosis, or at least considered, are stored in the permanent focus. The situation is not refuted, and therefore not retracted. As in claim 14, the retractable focus (partial memory region S3.2) stores the hypotheses that include assumptions about behavioral modes of components.

In a general case, it cannot be presupposed that the technical system is static. In a dynamic system, the behavioral mode of a component can change over the course of the diagnosis—for example, because of different situations that are set consecutively at the technical system. Such a behavioral mode is usually characterized as a "state." So that calculation results can be re-used, the inference machine requires a separate registration (the additional memory region S8), in which, for each time t at which a parameter value is measured or set, the situation at time t and the state sets at this time are stored. Mugur Tatar discloses the design and control of such a registration in "Diagnosis with Cascading Defects." Proceed. $6^{th}$ Intern. Workshop on Principles of Diagnosis (DX '95), pp. 107–114, Goslar (1995). The advantageous embodiment teaches the use of such a registration in connection with the invention according to claim 14 in a diagnosis device.

The times are registered, that is, stored, with the respective situations and state sets in the memory region S8. The first partial memory region (S3.1), namely the permanent focus, stores the situations, and the second partial memory region (S3.2) stores the state sets.

Many applications of technical diagnosis require the diagnosis device to operate quickly, yet use as little storage space and computation as possible. Sometimes, even real-time capability is required. An advantageous embodiment of the present invention meets this requirement in connection with the objective that the diagnosis device operates with as little input information as possible.

The state of the technology includes the data structure of the decision tree as a means of storing the information required by an information processing for making a classification. Decision trees are presented, for example, in J. Ross Quinlan; "Introduction of Decision Trees," Machine Learning Vol. 1, pp. 81–106 (1986). Technical diagnosis is such a classification objective. The idea behind the advantageous embodiment according to claim 17 is that the diagnosis device automatically processes a static decision tree in a first phase. A characterizing feature is that the input information that is present anyway is used exclusively to generate the decision tree, and no additional input information is required. The diagnosis device accordingly possesses two further information-processing devices: the generator and the processor. This division into generator and processor is advantageous for the following reason. Only the processor is required for the "actual" diagnosis of the technical system. Even if a plurality of similar technical systems is in use and must be diagnosed, only one generator is required, which constructs a copy-capable processor—comprising an individual diagnosis machine and a decision tree—multiple times, or constructs it once and makes multiple copies of it. The example of the diagnosis of motor vehicles makes the associated advantage clear: Only the processor need be used in hundreds of plants. On the other hand, only one generator need be built; the generated decision trees are delivered to the plants.

As is known from the state of the technology, a decision tree is a directional graph comprising nodes and edges, and has a single root (node without predecessors) and a plurality of leaves (nodes without successors). The advantageous embodiment according to claim 17 describes the structure of such a decision tree. Claim 17 distinguishes between two types of nodes:

Result nodes stand for an intermediate or end result attained over the course of the diagnosis. Therefore, each result node has a reference to a set of component errors and a reference to a situation of the technical system.

Decision nodes stand for a decision about the continuation of the diagnosis, which the diagnosis device automatically reaches based on previously-implemented measures.

The roots and leaves of the tree are result nodes. In addition to the leaves, each result node has a single successor, namely a decision node. A decision node has a successor, namely a result node, for each possible result of the associated measures.

It is obvious to one of skill in the art how a technical system is diagnosed through the processing of such a decision tree:

The processor begins in the root and has consequently reached a result node with a successor.

Whenever the processor has reached a result node with a successor, the processor "knows" that the associated component errors are still possible, and the technical system is located in the associated situation. The processor continues the diagnosis in the subsequent decision node.

Whenever the processor has reached a decision node, the associated measures are implemented. The processor continues the diagnosis in the result mode associated with the result of the measures that have just been implemented.

The diagnosis is ended when a leaf has been reached. The associated component errors are diagnosed, and the technical system is in the associated situation.

The foregoing claims describe diagnosis devices that automatically determine the measures to be implemented next. If these inventions are used in combination with the embodiment according to claim 17, a decision tree is generated that is used by the processor to diagnose the technical system quickly and at low cost.

The method claims describe the function process of the device of the invention.

Claim 18 describes the function and tasks of the individual machines, as well as the automatic allocation of measures based on the component type, in accordance with the invention.

Claims 20 and 21 describe the different embodiments of measures. They can be a measure for the accessibility of a parameter p, on the one hand, and determine the accessibility cost, on the other hand.

Claims 24 and 25 characterize further properties of the measures. Hence, a measure can be employed to determine whether and at what cost a parameter can be set at a specific value.

Claims 27 and 28 characterize the behavior of an improved focusing RMS comprising two external foci. Corresponding explanations of the device of the invention were given above.

The method claims 30 and 31 disclose a method of automatically generating a processor that comprises a diagnosis machine and a static decision tree. For this purpose, the method described in FIG. 2 and generally known from the cited literature is used to generate candidates. Generally-known cost-effectiveness heuristics are also used. The method is truncated when a branch is sufficiently certain, i.e., when a specific threshold value is not met or a certain probability is attained.

Definitions

A component-oriented system model is characterized by the following properties: The physical laws or constraints of the technical system are preferably described on a component level; and information structure, preferably a connection list, establishes which component is connected via which parameters to which other component at which other parameter; also given is an allocation of the components to component types, the type of a component determining which local parameters are defined for the component, and defining constraints between these parameters.

A measure at a parameter p is defined by a memory region having two sub-memories, one for the parameter p, to which the measure relates, and one for a logical predicate that represents the prerequisites of the measure.

A measure is valid in a logical context if the prerequisites of the measure are met in this context.

A local measure at a parameter p in a component-oriented system model is a measure in which the prerequisites comprise values that must be at system parameters that are adjacent at the same component type in the system model p.

A value context in a system model is the (logically conjunctive) allocation of values to different system parameters.

A situation in a system model is the (logically conjunctive) allocation of values to all free input parameters of the system.

A local measure is valid in a value context if all of the parameters adjacent to the parameter p of the local measure at the same component type have the values that are presupposed for the measure in this value context (i.e., the presupposed values are interpreted as a logical conjunction).

An evaluated (local) measure is defined like a (local) measure, but with an additional partial memory region for the cost of this measure.

A (local) value-allocation measure is defined like a (local) measure, but with an additional partial memory region for the value that, because of this measure, should be included by the parameter for which the (local) value-allocation measure is defined.

An evaluated (local) value-allocation measure is defined like a (local) value-allocation measure, but with an additional sub-memory for the costs of this (local) value-allocation measure.

An n-dimensional cost-balancing heuristic is a function that maps n numbers resulting from n cost functions onto a new value, the total costs or total assessment.

A cost-effectiveness heuristic is a function that maps a number resulting from a cost function and a number resulting from an effectiveness function onto a new value, the cost-effectiveness ratio.

LITERATURE LIST (c) BENES, Vitezlav: Automaticka diagnostika poruch energetickych zarizeni cislicovym pocitacem. *Energetika* 30 (1), pp. 21–24, 1980
Example of test selection with a probability theory that is not model-based (c) DAVIS, Randall: Diagnostic Reasoning Based on Structure and Behavior. *Artificial Intelligence* 24 (1), pp. 347–410; also in [1], pp. 376–407.
Foundations of model-based diagnosis (c) DE KLEER, Johan: An Assumption Based Truth Maintenance System. *Artificial Intelligence* 28, pp. 127–162, 1986.
Original essay on ATMS (c) DE KLEER, Johan/WILLIAMS, Brian: Diagnosing Multiple Faults. *Artificial Intelligence* 32 (1), pp. 97–130, 1987; also in [1], pp. 100–117.
Original essay on GDE (c) DE KLEER, Johan/Forbus, Ken: Focusing the ATMS. *Proceedings of the 7$^{th}$ National Conference on Artificial Intelligence (AAAI '88)*, pp. 193–198, Saint Paul (Minn., USA) 1988.
Focusing ATMS DE KLEER, Johan/Williams, Brian: Diagnosis with Behavioral Modes. *Proceedings of the 11$^{th}$ International Joint Conference on Artificial Intelligence (IJCAI '89)*, pp. 1324–1330, Detroit (Mich., USA) 1989; also in [1], pp. 124–130.
GDE, abductive approach, diagnosis strategies DE KLEER, Johan: Focusing on Probable Diagnoses. *Proceedings of the 9$^{th}$ National Conference on Artificial Intelligence (AAAI '91)*, pp. 842–848, Anaheim (Calif., USA) 1991.
GDE, abductive approach, diagnosis strategies DRESSLER, Oskar: Problem Solving with the NM-ATMS. *Proceedings of the 9$^{th}$ European Conference on Artificial Intelligence (ECAI '90)*, pp. 252–258, Stockholm (Sweden) 1990.
Focusing ATMS (c) DRESSLER, Oskar/FARQUHAR, Adam: Putting the Problem Solver Back in the Driver's Seat: Contextual Control of the ATMS, *Lecture Notes in AI* 515, Springer Verlag [publisher], 1990.
Focusing ATMS (c) DRESSLER, Oskar/FREITAG, Hartmut: Prediction Sharing Across Time and Contexts, *Proceedings of the 12$^{th}$ National Conference on Artificial Intelligence (AAAI '94)*, pp. 1136–1141, Seattle (Wash., USA) 1994.
ATMS with re-use of temporal calculations DRESSLER, Oskar/STRUSS, Peter: Back to Defaults: Characterizing and Computing Diagnoses as Coherent Assumption Sets, *Proceedings of the 10$^{th}$ European Conference on Artificial Intelligence (ECAI '94)*, Amsterdam (Netherlands) 1994.
Diagnosis strategies DRESSLER, Oskar/STRUSS, Peter: Model-Based Diagnosis with the Default-Based Diagnosis Engine: Effective Control Strategies that Work in Practice. *Proceedings of the 11$^{th}$ European Conference on Artificial Intelligence (ECAI '94)*, Amsterdam (Netherlands) 1994.
Diagnosis strategies (c) FORBUS, Ken/DE KLEER, Johan: Building Problem Solvers. *MIT Press*, 1993.
Textbook on inference machines with RMS FRIEDRICH, Gerhard/GOTTLOB, Georg/NEIJDL, Wolfgang: Physical Impossibility instead of Fault Models. *Proceedings of the 8$^{th}$ National Conference on Artificial Intelligence (AAAI '90)*, pp. 331–336, Boston (Mass., USA) 1990; also in [1], pp. 159–164. Abductive approach FRIEDRICH, Gerhard/NEIJDL, Wolfgang: Choosing Observations and Actions in Model-Based Diagnosis/Repair Systems. *Proceedings of the KR '92*, pp. 489–498, 1992.
Use of measures (c, [1]) HAMSCHER, Walter/CONSOLE, Luca/DE KLEER, Johan (Eds.): *Readings in Model-Based Diagnosis*, Morgan Kaufmann Publishers, San Mateo (Calif., USA) 1992.
Collection and critical evaluation of original essays on model-based diagnosis STRUSS, Peter/DRESSLER, Oskar: Physical Negation: Integrating Fault Models into the General Diagnostic Engine. *Proceedings of the 11$^{th}$ International Joint Conference on Artificial Intelligence (IJCAI '89)*, pp. 1318–1323, Detroit (Mich., USA) 1989; also in [1], pp. 153–158.
Abductive approach (c) STRUSS, Peter: What's in SD? Towards a Theory of Modeling for Diagnosis. *Working Notes of the 2$^{nd}$ International Workshop on Principles of Diagnosis, Technical Report* RT/DI/91-10-7, pp. 41–51, Torino (Italy) 1991; also in [1], pp. 419–449.
Granularity of modeling (c) STRUSS, Peter: Testing for Discrimination of Diagnosis. *Working Notes of the 5$^{th}$ International Workshop on Principles of Diagnosis*, pp. 312–320, New Paltz (N.Y., USA) 1994.
Systematic test proposal (c) SUN, Ying/WELD, Daniel: A Framework for Model-Based Repair. *Proceedings of the 11$^{th}$ National Conference on Artificial Intelligence (AAAI '93)*, pp. 182–187, USA, 1993.
Use of measures (c) TATAR, Mugur: Combining the Lazy Label Evaluation with Focusing Techniques in an ATMS. *Proceedings of the 11$^{th}$ European Conference on Artificial Intelligence (ECAI '94)*, Amsterdam (Netherlands) 1994.
Focusing ATMS (c) TATAR, Mugur: Diagnosis with Cascading Defects. *Working Papers of the 6$^{th}$ International Workshop on Principles of Diagnosis (DX '95)*, pp. 107–114, Goslar (Germany) 1995.
Diagnosis taking time into consideration (c) TATAR, Mugur/IWANOWSKI, Sebastian: Efficient Candidate Generation in a Model-Based Diagnostic Engine, *Technical Report* F3S-95-003, Daimler-Benz Research Berlin (Germany) 1995.

Candidate generators

What is claimed is:

1. A device for automatically diagnosing a technical system (tS), comprising components having
   a first information-processing unit (diagnosis machine) and
   a second information-processing unit (inference machine),
in which the two information-processing units have reading access to a first memory region (S1),
   which, for each component type (Comp Type) of which at least one copy is present in the technical system, stores information, including which parameters characterize this component type (Comp Type),
the two information-processing units having reading and writing access to a second memory region (S2),
   which stores information about the design of the technical system (tS), and, for each component of the technical system (tS), stores the following information:
      the component type of the component (Comp); and
      the other components to which the component (Comp) is connected,
         in that, for each other component (Comp_1) that is connected to the component (Comp), it is noted which parameter of the component (Comp) is identified with which other parameter of the connected component (Comp_1);
the two information-processing units having reading and writing access to a third memory region (S3),
   which can store value contexts, with a value context being information about the allocation of certain values to certain parameters of the technical system (tS),
   and which stores at least one value context (WT), at least from time to time;
the two information-processing units having reading and writing access to a fourth memory region (S4),
   which can store the value contexts,
the first information-processing unit (diagnosis machine)
   diagnosing the technical system, and, during a diagnosis, the second information-processing unit (inference machine) determining the value of at least one other parameter as a function of the value contexts in the third memory region (S3)
      for at least one value context that is stored in the third memory region (S3),
      through the evaluation of information that is stored in the first memory region (S1),
      and through the evaluation of information that is stored in the second memory region (S2),
the inference machine storing this information in the form of a value context in the fourth memory region (S4), characterized in that, for at least one component type (Comp Type),
   information about at least one measure (M) that can be implemented at the component type (Comp Type) is stored in the first memory region (S1),
      with the information about the parameter of the component type (Comp Type) to which the measure (M) relates being stored in a first partial memory region (S1.1) of the first memory region (S1),
      and a local prerequisite for the validity of the measure (M) being noted in a second partial memory region (S1.2) of the first memory region (S1), namely a specification that stipulates for which values of parameters of the component type (Comp Type) the measure (M) may be implemented, and,
   for at least one component (Comp) of this component type (Comp Type),
   and for at least one value context (WT) that is stored in the third memory region (S3),
the first information-processing unit (diagnosis machine)
   tests the validity of the measure (M) in the value context (WT),
      that is, it tests whether the measure (M) can be implemented at the component (Comp) in the value context (WT),
   and, for this test,
      it compares a value context that is stored in the fourth memory region (S4)
      to the local prerequisite for the validity of the measure (M), which is stored in the second partial memory region (S1.2).

2. The device according to claim 1, characterized by a third information-processing unit (model generator) and a sixth memory region (S6),
   which can store information about the technical system (tS),
   and to which the first two information-processing units have reading access and the third information-processing unit (model generator) has writing access;
the third information-processing unit (model generator) copies all information about the component type (Comp Type) for each component (Comp) of the technical system (tS)—the information being stored in the first memory region (S1)—and stores the copy, which is provided with a reference to the component (Comp), in the sixth memory region (S6);
for each pair (Comp_1, Comp_2) of connected components of the technical system (tS),
   about which the information that a specific parameter (Para_1) of the first component (Comp_1) is connected to a certain parameter (Para_2) of the second component (Comp_2) is stored in the second memory region (S2),
the third information-processing unit (model generator) either
   replaces both the first parameter (Para_1) of the first component (Comp_1)
   and the second parameter (Para_2) of the second component (Comp_2)
with a third parameter (Para) in the sixth memory region (S6), and,
   for each measure (M), for which the information that the measure (M) relates to the first parameter (Para_1) is stored in the sixth memory region (S6), the unit replaces this information with the information that the measure (M) relates to the third parameter (Para),
   and in the sixth memory region (S6), for each measure (M) for which the information that the measure (M) relates to the second parameter (Para_2) is stored,
the unit replaces this information with the information that the measure (M) relates to the third parameter (Para), and, in the sixth memory region (S6), for each local prerequisite (V), for the validity of a measure (M) at the component type (Comp Type), the unit replaces
   each reference to the first parameter (Para_1) with a reference to the third parameter (Para), and
   each reference to the second parameter (Para_2) with a reference to the third parameter (Para), or,
   in the sixth memory region (S6), the unit expands a specification that, in every case, that is, at every arbitrary value of a third parameter (Para_3), the value of the first parameter (Para_1) of the first component (Comp_1) is equal to the value of the second parameter (Para_2) of the second component (Comp_2).

3. The device according to claim 1, characterized by a fourth additional information-processing unit (RMS),
   which has reading access to the third memory region (S3), as well as
   reading access to the fourth memory region (S4),
   the unit additionally having a fifth memory region (S5), which can store information about connections between value contexts,
with at least two value contexts being stored consecutively or simultaneously in the third memory region (S3),
and a plurality of value contexts possibly being stored in the fourth memory region (S4),
the fourth information-processing unit (RMS) functioning as a Reason Maintenance System for the third memory region (S3) and the fourth memory region (S4), meaning that it stores information about the connections
   of value contexts that are stored in the third memory region (S3),
   or of combinations of several value contexts that are stored in the third memory region (S3),
   in the fifth memory region (S5) with value contexts that are stored in the fourth memory region (S4), and with
   at least two value contexts being stored in the third memory region (S3),
the first information-processing unit (diagnosis machine)
   testing, for at least one component (Comp) of the component type (Comp Type),
      whether the measure (M) is valid for the component (Comp) in a first value context (WT_1) that is stored in the third memory region (S3),
      and whether the measure (M) is valid for the component (Comp) in the second value context (WT_2) that is stored in the third memory region (S3),
   and, for this test,
      the unit evaluates at least one piece of information about connections of the first value context (WT_1) with further value contexts that are stored in the fifth memory region (S5),
      and evaluates at least one piece of information about connections of the second value context (WT_2) with further value contexts that are stored in the fifth memory region (S5).

4. The device according to claim 1, characterized by means that test whether the value of a parameter (Para) of a component (Comp) of the technical system (tS) can be determined in a certain value context (WT) that is stored in the third memory region (S3), in other words, whether the parameter (Para) is measurable or accessible,
   with information about a measure (M) at the component type (Comp Type) associated with the component (Comp) being stored in the first memory region (S1) in such a form that the information that the measure (M) relates to the parameter (Para) is stored in a first partial memory region (S1.1),
   and with the specification that m parameters (Para_1, . . . , Para_m) of the component type (Comp Type) are allocated the values (W_1, . . . , W_m) being stored, as a local prerequisite for the validity of this measure (M), in a second partial memory region (S1.2),
   and with the first information-processing unit (diagnosis machine) characterizing the parameter (Para) as ascertainable in the value context (WT) when it has determined that the measure (M) is valid in the value context (WT).

5. The device according to claim 1, characterized by means of testing, over the course of the diagnosis, whether the value of a parameter (Para) of a component (Comp) of the technical system (tS) can be determined in a specific value context (WT) that is stored in the third memory region (S3),
   in other words, whether the parameter (Para) is measurable or accessible,
   with information about a first measure (M) at the component type (Comp Type) of the component (Comp),
   and information about a second measure (M1) at the component type (Comp Type) and information about a third measure (M2) at the component type (Comp Type) being stored in the first memory region (S1) in such a form that the information that the first measure (M) relates to the parameter (Para) is stored in a first partial memory region (S1.1), and
      with the specification that the second measure (M1) or the third measure (M2) is valid being stored as a local prerequisite for the validity of the first measure (M) in a second partial memory region (S1.2), and
      with the specification that m parameters (Para_1$^{(1)}$, . . . , Para_m$^{(1)}$) of the component type (Comp Type) are allocated the values (W_1$^{(1)}$, . . . , W_m$^{(1)}$) being stored in the second partial memory region (S1.2) as a local prerequisite for the validity of the second measure (M1), and
      with the specification that n parameters (Para_1$^{(2)}$, . . . , Para_n$^{(2)}$) of the component type (Comp Type) are allocated the values (W_1$^{(2)}$, . . . , W_n$^{(2)}$) being stored in the second partial memory region (S1.2) as a local prerequisite for the validity of the third measure (M2),
   and the first information-processing unit (diagnosis machine) characterizing the parameter (Para) as ascertainable in the value context (WT) when it has determined that the measure (M) is valid in the value context (WT).

6. The device according to claim 1, characterized by means which, over the course of the diagnosis, determine the cost at least once, which effects the determination of the value of a parameter (Para) of a component (Comp) of the technical system (tS) in a certain value context (WT) that is stored in the third memory region (S3),
   with information about a measure (M) at the component type (Comp Type) of the component (Comp) being stored in the first memory region (S1),
   with a first partial memory region (S1.1) storing the information that the measure (M) relates to the parameter (Para),
   and a third partial memory region (S1.3) storing
      either an identification for which cost the implementation of the measure (M) incurs,
      or a calculation specification that determines an identification of the cost for implementing the measure (M) as a function of the values of other parameters of the component type (Comp Type),
   and the diagnosis device then uses the identification of the cost of the measure as the identification of the cost incurred by the determination of the value of the parameter (Para) in the value context (WT) when the measure (M) is valid in the value context (WT).

7. The device according to claim 6, characterized in that the first memory region (S1) stores
information about a first measure (M1) at the component type (Comp Type) of the component (Comp),
and information about a first measure (M2) at the component type (Comp Type),
with a first partial memory region (S1.1) storing the information that the first measure (M1) and the second measure (M2) relate to the parameter (Para),
and a second partial memory region (S1.2) storing a local prerequisite for the validity of the first measure (M1) and a local prerequisite for the validity of the second measure (M2),
and a third partial memory region (S1.3) storing
either an identification for the cost incurred by the implementation of the first measure (M1),
or a calculation specification that determines an identification of the cost for implementing the first measure (M1) as a function of the values of other parameters of the component type (Comp Type),
and the third partial memory region (S1.3) storing
either an identification for the cost of implementing the second measure (M2),
or a calculation specification that determines an identification of the cost for implementing the second measure (M2) as a function of the values of other parameters of the component type (Comp Type),
the diagnosis device using the identification of the cost of the first measure (M1) as the identification of the cost of determining the value of the parameter (Para) in the value context (WT)
if the first measure (M1) is valid in the value context (WT), and, if the second measure (M2) is valid in the value context (WT), the diagnosis device uses the identification of the cost of the second measure (M2) as the identification of the cost of determining the value of the parameter (Para) in the value context (WT).

8. The device according to claim 6, characterized by a fifth information-processing unit (cost assessor) and a sixth information-processing unit (effectiveness assessor), the device including an operation unit (cost-effectiveness comparator) having two inputs and an output;
for at least one parameter (Para), the fifth information-processing unit (cost assessor) determines, at least once during the diagnosis,
an identification of the cost incurred by the determination of the parameter (Para),
and the sixth information-processing unit (effectiveness assessor) determines
the effectiveness of the parameter (Para) that is an identification of the contribution made by the allocation of a value to the parameter (Para) to the determination of the component errors of the technical system, and
the identification of the cost of determining the parameter (Para)
and the effectiveness of the parameter (Para) are applied to the operation unit (cost-effectiveness comparator) as the input values,
and the operation unit (cost-effectiveness comparator) uses these two input values to determine an output value.

9. The device according to claim 6, characterized by means that bring the technical system (tS) into a specific situation,
with one situation being the allocation of values to all freely-settable parameters of the technical system (tS),
and, afterward, a parameter is selected, whose value is determined as the next step of the diagnosis,
with the third memory region (S3) storing m situations $\{S\_1, \ldots, S\_m\}$, where m is an arbitrary natural number;
for n parameters $\{Para\_1, \ldots, Para\_n\}$ of the technical system (tS), with n being an arbitrary natural number, for each $j=1, \ldots, n$, information about the cost incurred by the determination of the parameter $Para\_j$ is stored;
the first information-processing unit (diagnosis machine) determines the next steps in the diagnosis of the technical system (tS) by
determining an identification of the cost for each $i=1, \ldots, m$ and each $j=1, \ldots, n$ incurred by the determination of the parameter $Para\_j$ when the technical system (tS) was brought into the situation $S\_i$,
and then determining the parameter $Para(S\_i)$ for each $i=1, \ldots, m$ from the set $\{Para\_1, \ldots, Para\_n\}$, the determination of which incurs the lowest cost in the situation $S\_i$,
and then determining the situation $S\_x$, for which the cost of determining the parameter $Para(S\_x)$ is lowest, from the set $\{S\_1, \ldots, S\_m\}$; and
the first information-processing unit (diagnosis machine) then
brings the technical system (tS) into the situation $S\_x$; and, afterward,
selects the parameter $Para(S\_x)$ as the parameter whose value is determined as the next step of the diagnosis.

10. The device according to claim 1, characterized by means for testing whether the value of a parameter (Para) of a component (Comp) of the technical system (tS) can be set at a specific value
in a specific value context (WT) that is stored in the third memory region (S3),
the first memory region (S1) storing information about a measure (M) at the component type (Comp Type) of the component (Comp),
with a first partial memory region (S1.1) storing the information about the parameter (Para) to which the measure (M) relates,
and a second partial memory region (S1.2) storing
the specification from which the valid allocation of the values $(W\_1, \ldots, W\_m)$ to the m parameters $(Para\_1, \ldots, Para\_m)$ of the component type (Comp Type) is apparent, as a local prerequisite for the validity of this measure (M),
and the first information-processing unit (diagnosis machine) assessing the parameter (Para) as settable in the value context (WT) when the measure (M) is valid in the value context (WT).

11. The device according to claim 1, characterized by means that test whether the value of a parameter (Para) of a component (Comp) of the technical system (tS) can be set at a specific value
in a specific value context (WT) that is stored in the third memory region (S3),
with the first memory region (S1) storing information about a first measure (M) at the component type (Comp Type) of the component (Comp),
and information about a second measure (M1) at the component type (Comp Type), and information about a third measure (M2) at the component type (Comp Type), in such a form that a first partial memory region (S1.1) stores the information that the first measure (M) relates to the parameter (Para), a second partial memory region (S1.2) stores the specification that the second measure (M1) or the third measure (M2) is valid, as a local prerequisite for the validity of the first measure (M), and the specification that $n^{(1)}$ parameters (Para_$1^{(1)}$, ..., Para_$n^{(1)}$) of the component type (Comp Type) are allocated the values (W_$1^{(1)}$, ..., W_$n^{(1)}$) as a local prerequisite for the validity of the second measure (M1), and the specification that $n^{(2)}$ parameters (Para_$1^{(2)}$, ..., Para_$n^{(2)}$ of the component type (Comp Type) are allocated the values (W_$1^{(2)}$, ..., W_$n^{(2)}$, as a local prerequisite for the validity of the third measure (M2);

and the first information-processing unit (diagnosis machine) characterizes the parameter (Para) as settable in the value context (WT) when it has determined that the measure (M) is valid in the value context (WT).

12. The device according to claim 1, which determines, at least once over the course of the diagnosis, an identification of the cost incurred by the setting of a parameter (Para) of a component (Comp) of the technical system (tS) to a certain value (W) in a certain value context (WT) that is stored in the third memory region (S3), with the first memory region (S1) storing information about a measure (M) at the component type (Comp Type) of the component (Comp), with a first partial memory region (S1.1) storing the information that the measure (M) relates to the parameter (Para), and a third partial memory region (S1.3) storing either an identification for which cost the implementation of the measure (M) incurs, or a calculation specification that determines an identification of the cost for implementing the measure (M) as a function of the values of other parameters of the component type (Comp Type), the diagnosis device using the identification of the cost of the measure (M) as the identification of the cost incurred by the setting of the parameter (Para) at the value (W) in the value context (WT) when the measure (M) is valid in the value context (WT).

13. The device according to claim 12, characterized in that the first memory region (S1) stores information about a first measure (M1) at the component type (Comp Type) of the component (Comp), and information about a first measure (M2) at the component type (Comp Type), and a first partial memory region (S1.1) stores the information that the first measure (M1) and the second measure (M2) relate to the parameter (Para), and a second partial memory region (S1.2) stores a local prerequisite for the validity of the first measure (M1) and a local prerequisite for the validity of the second measure (M2), and a third partial memory region (S1.3) stores either an identification for the cost incurred by the implementation of the first measure (M1), or a calculation specification that determines an identification of the cost for implementing the first measure (M1) as a function of the values of other parameters of the component type (Comp Type), and the third partial memory region (S1.3) stores either an identification for the cost of implementing the second measure (M2), or a calculation specification that determines an identification of the cost for implementing the second measure (M2) as a function of the values of other parameters of the component type (Comp Type), and the diagnosis device uses the identification of the cost of the first measure (M1) as the identification of the cost of setting the parameter (Para) at the value (W) in the value context (WT)

if the first measure (M1) is valid in the value context (WT), and, if the second measure (M2) is valid in the value context (WT), the diagnosis device uses the identification of the cost of the second measure (M2) as the identification of the cost of setting the parameter (Para) at the value (W) in the value context (WT).

14. A device for automatic diagnosis of a technical system (tS), comprising components having a first information-processing unit (diagnosis machine) and a second information-processing unit (inference machine), and a fourth information-processing unit (RMS), the first two information-processing units having reading access to a first memory region (S1), which stores information for each component type (Comp Type) of which at least one copy is present in the technical system, including which parameters characterize this component type (Comp Type), the first two information-processing units having reading and writing access to a second memory region (S2), which stores information about the design of the technical system (tS), and the following information for each component (Comp) of the technical system (tS):

the component type of the component (Comp); and the other components to which the component (Comp) is connected, in that, for each other component (Comp_1) that is connected to the component (Comp), it is noted which parameter of the component (Comp) is identified with which other parameter of the connected component (Comp_1);

with all three of the information-processing units having reading and writing access to a third memory region (S3), which can store value contexts, a value context being information about the allocation of certain values to certain parameters of the technical system (tS), and which stores at least one value context (WT), at least from time to time;

with all three of the information-processing units having reading and writing access to a fourth memory region (S4), which can store and strike value contexts, with the second and third information-processing units having reading and writing access to a fifth memory region (S5), which can store information about connections between value contexts;

the first information-processing unit (diagnosis machine)

diagnoses the technical system, and, during a diagnosis, the second information-processing unit (inference machine) determines the value of at least one other parameter as a function of the value contexts in the third memory region (S3)

for at least one value context that is stored in the third memory region (S3), through the evaluation of information that is stored in the first memory region (S1), and through the evaluation of information that is stored in the second memory region (S2), the inference machine storing this information in the form of a value context in the fourth memory region (S4), the fourth information-processing unit (RMS) functioning as a Reason Maintenance System for the third memory region (S3) and the fourth memory region (S4), meaning that it stores information about the connections of value contexts that are stored in the third memory region (S3), or of combinations of several value contexts that are stored in the third memory region (S3)

with value contexts that are stored in the fourth memory region (S4) in the fifth memory region (S5), characterized in that the device additionally includes a seventh memory region (S7), in which a value context can be stored, and to which the fourth information-processing unit (RMS) has reading and writing access;

the third memory region (S3) is divided into two partial memory regions, with the value contexts that are stored in the first partial memory region (S3.1) being classified as permanent, that is, they cannot be struck from this partial memory region (S3.1) during the entire course of the diagnosis, and with the value contexts that are stored in the second partial memory region (S3.2) being classified as retractable, that is, they can be struck from this partial memory region (S3.2) over the course of the diagnosis, and the seventh memory region (S7) stores each value context that is formed by a logical conjunction of a value context from the first partial memory region (S3.1)

and a value context from the second partial memory region (S3.2);

and the fourth information-processing unit (RMS)

always updates the contents of the seventh memory region (S7)

when the first partial memory region (S3.1) is expanded by at least one value context, and the fourth information-processing unit (RMS)

always updates the contents of the seventh memory region (S7) when the second partial memory region (S3.2) is expanded by at least one value context, and the fourth information-processing unit (RMS)

always updates the contents of the seventh memory region (S7) when at least one value context has been struck from the second partial memory region (S3.2), and the fourth information-processing unit (RMS)

functions as a Reason Maintenance System for the third memory region (S3) and the fourth memory region (S4) by storing information about the connections of value contexts that are stored in the seventh memory region (S7)

with value contexts that are stored in the fourth memory region (S4)

in the fifth memory region (S5).

15. The device according to claim 14, characterized by means for diagnosis of a technical system (tS) that is static during the diagnosis, namely a technical system in which the values of all dependent parameters are uniquely determined by a situation, which is an allocation of values to all freely-settable parameters of the technical system, with each situation that occurs or is set during the diagnosis of the technical system (tS) being stored in the first partial memory region (S3.1) of the third memory region (S3).

16. The device according to claim 14, characterized by an additional, eighth memory region (S8), to which the second information-processing unit (inference machine) has reading and writing access, with the eighth memory region (S8) storing a registration for each time t, at which the value of a parameter of the technical system (tS) is measured or set, the registration comprising a reference to the time t, and a reference to the situation that is present at the time t, a situation being an allocation of values to all freely-settable parameters, and a reference to the state sets associated with this situation at the time t, a state set being an allocation of values to parameters that characterize the state of components of the technical system, and, for each time t, at which the value of a parameter of the technical system (tS) is measured or set, the first partial memory region (S3.1) stores a reference to the situation at the time t, and the second partial memory region (S3.2) stores a reference to the state sets that are associated with this situation at the time t.

17. The device according to claim 1, characterized by a fourth information-processing unit (generator), a fifth information-processing unit (processor), and a ninth memory region (S9);

the fourth information-processing unit (generator)

has writing access to the first memory region (S1), and writing access to the second memory region (S2), and writing access to the ninth memory region (S9);

the fifth information-processing unit (processor)

has reading access to the ninth memory region (S9);

in a first phase, the fourth information-processing unit (generator) automatically generates a decision tree, and stores it in the ninth memory unit (S9), and, in a second phase, the fifth information-processing unit (processor) diagnoses the technical system (tS) by processing the decision tree, the decision tree comprising two types of nodes, namely result nodes, which are nodes that have a reference to a set of component errors and a reference to a situation, and decision nodes, which are nodes that have a reference to a set of measures, with result nodes being successors of a decision node, and a result node that is not a leaf having exactly one decision node as a successor, and the roots and leaves of the decision tree being result nodes.

18. A method of diagnosing a technical system comprising individual components, with the use of the device according to claim 1, in which a construction model is preferably represented with a connection list, the connection list describing the connection of the components to other components via parameters, with the local parameters and the connections of these components being established by constraints through a typifying of the components, with an inference machine that evaluates constraints with the use of value contexts, with a diagnosis device requesting values from the inference machine in order to compare them to the measured values of the technical system to ascertain an error, and with measures being automatically stored for at least one component through the allocation to a component type, with a specification establishing at which values of parameters the measure may be implemented, and the diagnosis machine testing the validity of at least one measure with the aid of the specification, taking into consideration the obtained information over the further course of the diagnosis.

19. The method according to claim 18, characterized in that the elements of the connection list are evaluated, and, for establishing the validity of the measures, either the parameters p1 and p2 to be connected are replaced by a unique copy p, which is evaluated in the continued procedure, or a logical specification (constraint) that stipulates that the values p1 and p2 be identical is automatically generated.

20. The method according to claim 19, characterized in that the local measure is defined such that the measurability or accessibility of a parameter p is established as a function of presupposed values at system parameters that are present at the same component type in the system model p.

21. The method according to claim 18, characterized in that the local measures are evaluated, so the measurability and/or accessibility cost of a parameter p can be calculated as a function of presupposed values at system parameters that are preferably present at the same component type in the system model p, then incorporated automatically into a decision finding.

22. The method according to claim 21, characterized in that a cost-effectiveness ratio is determined as a function of a predetermined value context, the values relating to arbitrary system parameters, and with consideration of the cost, and the ratio is then automatically incorporated into a decision finding.

23. The method according to claim 22, characterized in that the value context having the best cost-effectiveness ratio is selected from a set of predetermined value contexts, which permits the best setting of the system with the use of the determined value context.

24. The method according to claim 18, characterized in that the local measures are defined such that the ability of a parameter p to be set at a specific value is established as a function of presupposed values at system parameters that are present at the same component type in the system model p.

25. The method according to claim 18, characterized in that the local measures are evaluated, so the cost of setting a parameter p is calculated as a function of presupposed values at system parameters that are preferably present at the same component type in the system model p.

26. The method according to claim 25, characterized in that a cost-effectiveness ratio is determined as a function of a predetermined value context, the values relating to arbitrary system parameters, and with consideration of the cost, and the ratio is then automatically incorporated into the decision finding.

27. A method of diagnosing a technical system, having a Reason Maintenance System that provides a series of value contexts for accelerating the processing, the value contexts being used to calculate the validity of a measure; the Reason Maintenance System is focusing, and has an internal and an external focus, and utilizes the device according to claim 14, characterized in that the external focus is divided into two further foci, one of which contains the permanent, non-exchangeable value contexts, while the other contains retractable, and thus exchangeable, value contexts; the internal focus is formed by the external foci through a linking of the value contexts, and is updated automatically if a change occurs in one of the external foci.

28. The method according to claim 27, characterized in that, in dynamic technical systems, the times are described as situations, and all of the situations selected from the inference machine are placed into the permanent focus.

29. The method according to claim 27, characterized in that, in static technical systems, at each time to be observed, the associated situations and associated state sets are stored and, for each time, the associated situations are consecutively brought into the permanent focus, and the associated state sets are placed into the retractable focus.

30. A method of automatically generating a processor comprising a static decision tree, and a diagnosis machine having the device according to claim 1, in which, a first step begins with the diagnosis set F, which contains only the diagnosis that all is in order, and an initial situation S; a result node is generated with the output F and the corresponding measures;

in a second step, the branch is truncated when F is sufficiently certain; otherwise, a method is employed for using S and a predetermined candidate-generation method to calculate successor situations based on an ordering relation between the situations and a predetermined, two-dimensional cost-balancing heuristic and a predetermined cost-effectiveness heuristic for finding the situation S', which yields the parameter having the best cost-effectiveness ratio in S' with respect to F, the result being the model parameter p and the situation S', and a decision node being generated with the measures in the tree, which makes the transition to the situation S' and measures p;

in a third step, the effects of x and the resulting diagnosis set F are calculated for each possible value x of p in S', with a result node being generated with the output F for continuing with Step two for each value x.

31. The method according to claim 30, characterized that the cost-effectiveness heuristic according to claim 22 is used in the second step.

* * * * *